B. F. SMITH.
AUTOMATIC CAR WHEEL LUBRICATOR.
APPLICATION FILED JUNE 18, 1913.
1,125,750.
Patented Jan. 19, 1915.
3 SHEETS—SHEET 1.
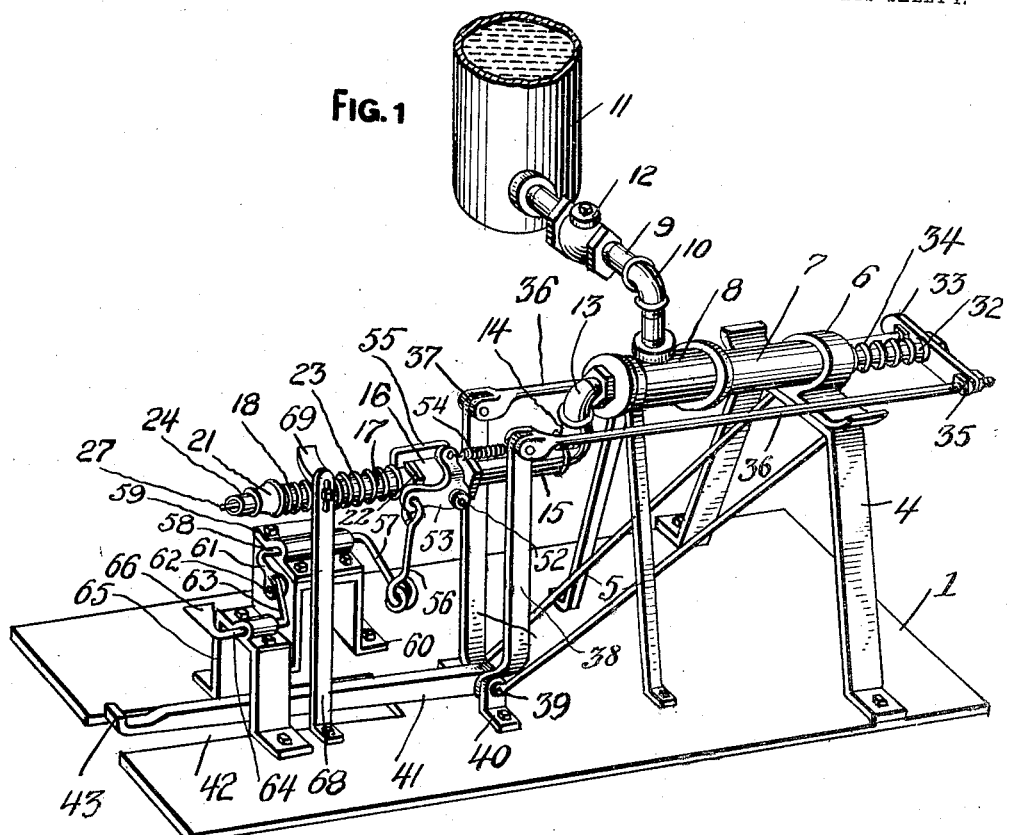
WITNESSES
INVENTOR
B. F. SMITH.
ATTORNEY

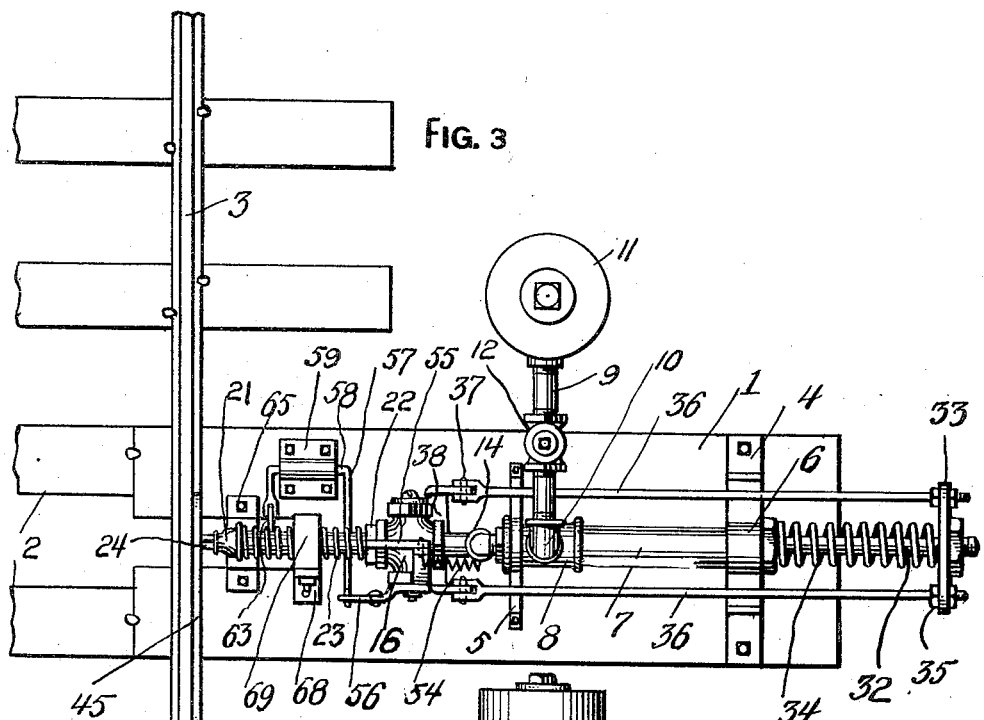

B. F. SMITH.
AUTOMATIC CAR WHEEL LUBRICATOR.
APPLICATION FILED JUNE 18, 1913.
1,125,750.
Patented Jan. 19, 1915.
3 SHEETS—SHEET 3.
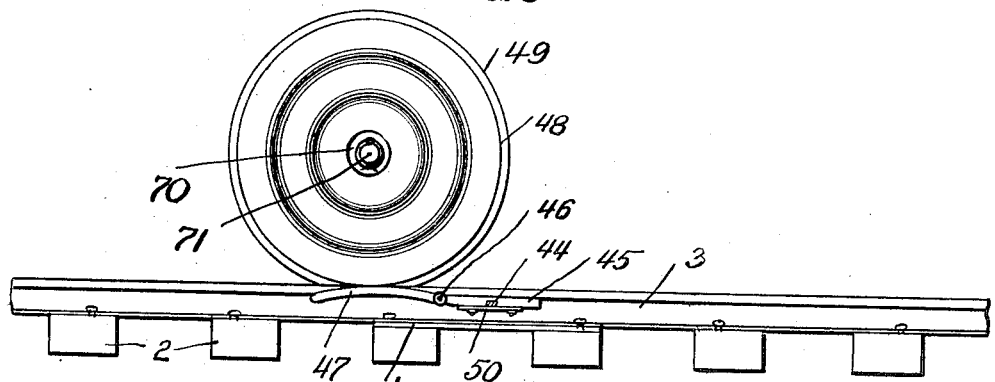
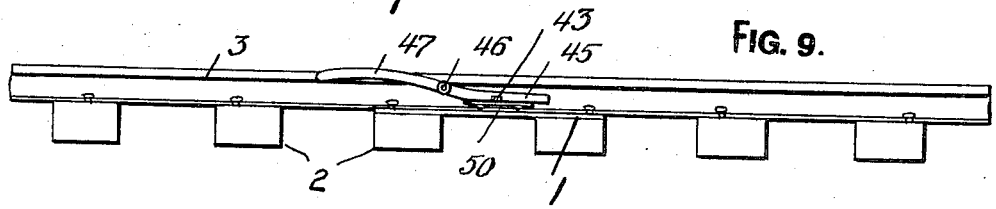
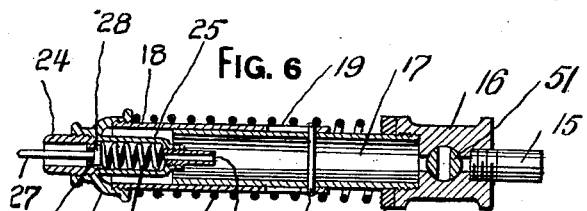
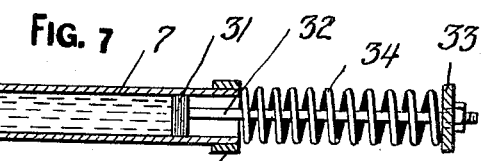
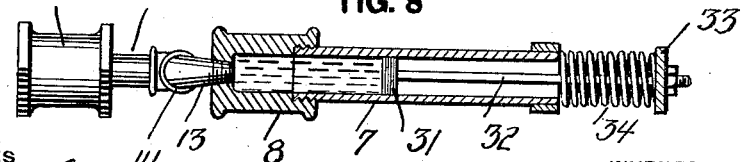
WITNESSES
INVENTOR
B. F. SMITH.
ATTORNEY

UNITED STATES PATENT OFFICE.

BERTRUM FRANKLIN SMITH, OF NATRONA, PENNSYLVANIA.

AUTOMATIC CAR-WHEEL LUBRICATOR.

1,125,750.  Specification of Letters Patent.  Patented Jan. 19, 1915.

Application filed June 18, 1913. Serial No. 774,298.

*To all whom it may concern:*

Be it known that I, BERTRUM FRANKLIN SMITH, a citizen of the United States of America, residing at Natrona, in the county of Allegheny and State of Pennsylvania, have invented certain new and useful Improvements in Automatic Car-Wheel Lubricators, of which the following is a specification, reference being had therein to the accompanying drawing.

This invention relates to an automatic car wheel lubricator, and more particularly to a device that can be advantageously used for injecting oil or a suitable lubricant into the journal boxes of cars used upon industrial railways.

My invention aims to provide: First, a lubricating device that can be located at the side of a track and actuated by a car thereon for injecting a quantity of oil into an axle journal box or the hub of a wheel. Second, a lubricating device of the above type that is automatically actuated by a car to inject lubricant into a wheel hub as a car is moving, the construction of the device being such as to permit of movable parts thereof yielding whereby under ordinary conditions the device can be safely used with a minimum amount of repair. Third, a lubricator of the above type embodying a novel pump that is supplied with oil the oil being automatically ejected from the pump as the pump is actuated by the tread or flange of a car wheel. Fourth, a lubricating device of the above type consisting of comparatively few parts that are easy to assemble, durable, inexpensive to manufacture, and highly efficient for the purposes for which they are intended.

I attain the above and other objects by a mechanical construction that will be hereinafter specifically described and then claimed, and reference will now be had to the drawings, wherein:—

Figure 1 is a perspective view of the lubricating device, showing the reservoir partly broken away and partly in section. Fig. 2 is a plan of the device as actuated by a car wheel. Fig. 3 is a similar view showing the device in its normal position. Fig. 4 is a side elevation of the device as actuated by a car wheel. Fig. 5 is a side elevation of a portion of the track showing the equipment as actuated by a car wheel. Fig. 6 is an enlarged longitudinal sectional view of a nozzle. Figs. 7 and 8 are longitudinal sectional views of the pump, and Fig. 9 is a side elevation of the track equipment in its normal position.

In describing my invention by aid of the drawings above referred to I desire to point out that I intend said views as merely illustrative of an example whereby my invention may be applied in practice, and I do not limit my claims to the precise arrangement and construction of parts indicated. The following description is therefore to be construed broadly as including substitute arrangements and constructions which are the obvious equivalent of those shown.

In the drawings 1 denotes a base plate that is rectangular in plane and this plate can be mounted upon a suitable foundation at the side of the track. It is preferable to use ties 2 of greater length than the ordinary ties and mount the plate upon the ends of the ties with the inner end of the plate extending under a rail 3 of the track.

Secured to the base plate 1 are A-frames 4 and 5, the frame 4 having a strap 6 supporting a pump cylinder 7. The frame 5 supports a T connection 8 that is connected to the cylinder 7. The T connection 8 is connected by pipes 9 and an elbow 10 to a suitable reservoir 11 adapted to contain oil or other lubricant. A conventional form of check valve 12 is located upon the pipe 9 and this check valve prevents oil from being forced into the reservoir 11 after having once entered the T connection 8 and the cylinder 7. The T connection 8 is connected by an elbow 13 to an elbow swivel connection 14 having a pipe 15 provided with a valve 16. Connected to the valve 16 is a sectional telescopic nozzle pipe, said pipe comprising an inner section 17 and an outer section 18, said outer section telescoping the inner section, as best shown in Fig. 6. The outer section 18 is slotted, as at 19 and the inner section 17 has a transverse pin 20 that extends into said slots and limits the movement of the outer section relatively to the inner section. The outer section 18 has a reducing head 21 and encircling said sections, between the head 21 and a stirrup 22 is a coiled compression spring 23 that holds the outer section normally extended relatively to the inner section. The stirrup 22 encircles the inner end of the section 17 and this stirrup will be hereinafter more fully referred to.

The reducing head 21 has a nozzle 24 and an inwardly extending spring housing 25. The nozzle 24 is provided with a spider 26 and movable in said spider is a stem 27 of a valve 28 adapted to normally close the spider. The valve 28 is retained in engagement with the spider 26 by a coiled compression spring 29 mounted in the housing 25, and said housing has a nipple 30 extending into the inner section 17, whereby it can readily receive oil from said section.

Movable in the cylinder 7 is a piston head 31 provided with a piston rod 32 that extends out of the end of the cylinder. The piston rod 32 has a cross head 33 and encircling said piston rod, between the end of the cylinder 7 and the cross head 33, is a coiled retractile spring 34 that has the ends thereof attached to said cross head and to the end of the cylinder. The tension of this spring is sufficient to hold the piston head 31 in a retracted position in proximity to the end of the cylinder, whereby oil can flow from the reservoir 11 into the cylinder and the T connection 8.

Connected, as at 35 to the ends of the cross head 33 are parallel rods 36 having bifurcated ends, pivotally connected, as at 37 to the ends of a yoke 38. The yoke 38 is mounted upon a rock shaft 39, journaled in bearings 40, carried by the base plate 1, beneath the pipe 15. Mounted upon the shaft 39 is one end of a lever 41, said lever extending over a slot 42 formed in the plate 1 to provide clearance for a depression of the outer end of said lever. The shaft 39 connects the yoke 38 and lever 41 together. The outer end of said lever is substantially hook-shaped, as at 43 and is mounted in a notch 44 provided therefor in the bottom side of an arm 45 that is fulcrumed or pivoted upon the side of the rail 3, as at 46. The arm 45 has a curved tread end 47 adapted to be depressed by the tread 48 of a wheel 49. The end of the lever 41 is held in the notch 44 of the arm 45 by a strap 50 and it is through the medium of this connection that the tread portion 47 of said arm is held normally elevated by the tension of the spring 34, which retains the piston head 31 in a retracted position.

The plug 51 of the two-way valve 16 has a stem 52 and mounted upon said stem is a bell crank 53. An arm of said crank is connected by a coiled retractile spring 54 to the swivel elbow and the same arm has a connection 55 with the stirrup 22. The other arm of said bell crank is connected by a link 56 to the crank 57 of a rock shaft 58. The rock shaft 58 is journaled in a bearing 59, carried by an upright 60, secured to the base plate 1. The rock shaft 58 has a crank 61 pivotally connected, as at 62 to the crank 63 of a rock shaft 64. The rock shaft 64 is journaled in a bearing 65, carried by the base plate 1. The rock shaft 64 has another crank in the form of a trigger 66 and this trigger is adapted to be engaged by the crown or bell 67 of the wheel 49. Located adjacent to the bearing 65 is an upright 68 provided with a curved or beveled guide 69, said upright limiting the movement of the nozzle in one direction while the guide 69 guides the nozzle into engagement with said upright.

In operation, the valves 28 and 16 are normally closed, and the connection 8 and the cylinder 7 are full of oil. When the tread 48 of the wheel 49 encounters the tread portion 47 of the arm 45, the tread portion 47 is depressed and the hook-shaped end of the lever 41 is elevated, thereby rocking the shaft 39, moving the yoke 38, shifting the rods 36 and moving the cross head 33, whereby the piston head 31 is placed in a retracted position and the coiled spring 34 under tension. This position of the spring is shown in Fig. 7 and in consequence of the piston head 31 being placed in a retracted position the cylinder 7 receives a greater charge of oil. As the crown or bell 67 of the wheel 49 impinges the trigger 66, the shafts 64 and 58 are rocked, thereby moving the bell crank 53 and opening the valve 16. Simultaneous with the opening of the valve 16 the stirrup 22 is advanced upon the nozzle pipe and the tension of the spring 23 is sufficient to extend the nozzle pipe section 18, whereby the nozzle 24 will be placed in a journal box or the opening 70 of the crown or bell 67 of the wheel 49. By this time a quantity of oil has passed into the telescopic nozzle pipe, and as the stem 27 of the valve 28 impinges the end of an axle 71 or an element of the journal box, the valve 28 is opened thereby establishing communication between the wheel and the telescopic nozzle pipe. At this instant in the operation of the device the tread portion 47 of the arm 45 is released and the lever 41, yoke 38 and the rod 36 released, whereby the spring 34, which has been placed under tension, can shift the piston head 31. A quantity of oil is therefore ejected from the telescopic nozzle pipe into the nipple 30, through the housing 25 and the spider 26 and from the nozzle 24. Of course the wheel 49 is slowly moving and in order that sufficient time lapse for the injection, the elements 14 to 27 inclusive shift in a lateral plane, as shown in Fig. 2, this being accomplished through the medium of the swivel elbow 14. The injection having taken place the wheel 49 continues to move without injuring the elements 14 to 27 inclusive and said elements are restored to their normal position through the medium of the coiled retractile spring 54. The tension of this spring also closes the valve 16, while the spring 29 closes the valve 28, and the device is again in position to lubricate another wheel.

From the foregoing it will be observed that it is the rapid action of a compressed spring being released that produces the injection of oil into a wheel or the journal box thereof, and that the valves are so arranged as to practically simultaneously operate in controlling the injection. With the nozzle yielding in a lateral plane a portion of the injection takes place during its movement and the movable parts of the device can be timed to operate whereby the loss of oil is reduced to a minimum.

What I claim is:—

1. In a lubricator for wheels, a pump, a reservoir in communication therewith, a swiveled telescopic nozzle in communication with said pump, a valve controlling the discharge from said nozzle, a trigger adapted to be actuated by a car wheel for opening said valve, and a spring mechanism including a piston placed under tension by a car wheel for forcing lubricant from said pump.

2. A lubricator for car wheels comprising a pump, a reservoir in communication therewith, a swiveled telescopic nozzle carried by said pump, a valve controlling the discharge from said nozzle, a trigger adapted to be actuated by a wheel for opening said valve, and a track equipment adapted to be actuated by a car wheel for operating said pump to force lubricant into said nozzle.

3. A lubricator for car wheels comprising a pump, a spring actuated piston therein, a reservoir in communication with said pump, a swiveled nozzle carried by said pump, a valve controlling the discharge from said nozzle, a trigger adapted to be actuated by a wheel to open said valve, and a track equipment adapted to be actuated by a wheel to release said spring actuated piston whereby a lubricant is forced from said pump into said nozzle and discharged therefrom.

4. In a lubricator for car wheels, a pump, a spring actuated piston movable in said pump, a wheel actuated track mechanism for placing said piston in a retracted position, a reservoir in communication with said pump, a swiveled telescopic nozzle carried by said pump and capable of lateral movement, a valve controlling the passage of lubricant into said nozzle, a trigger adapted to be actuated by a wheel to open said valve, and means for simultaneously holding said valve closed and said nozzle in alinement with said pump.

5. In a lubricator for car wheels, a pump, a spring actuated piston movable in said pump, a wheel actuated track mechanism for placing said piston in a retracted position, a reservoir in communication with said pump, a swiveled telescopic nozzle carried by said pump and capable of lateral movement, a valve controlling the passage of lubricant into said nozzle, a trigger adapted to be actuated by a wheel to open said valve, means for simultaneously holding said valve closed and said nozzle in alinement with said pump, and means for limiting the lateral movement of said nozzle in one direction.

6. In a lubricator for car wheels, a pump, a reservoir in communication therewith, a swiveled nozzle carried by said pump and capable of lateral movement, a valve controlling the discharge from said nozzle, a trigger adapted to be actuated by a wheel to open said valve, and means actuated by a car wheel for placing said pump in operation to discharge lubricant from said nozzle.

7. In a lubricator for car wheels, a pump, a reservoir in communication therewith, a swiveled nozzle carried by said pump and capable of lateral movement, a valve controlling the discharge from said nozzle, a trigger adapted to be actuated by a wheel to open said valve, and means actuated by a car wheel for placing said pump in operation to discharge lubricant from said nozzle, said means including a spring actuated piston and a track equipment for moving said piston.

8. A lubricator for car wheels comprising a pump, a reservoir in communication therewith, a spring held piston movable in said pump, a swiveled nozzle carried by said pump for discharging lubricant into a wheel, and a track equipment adapted to be actuated by a wheel to place said piston in a retracted position whereby when said equipment is released by a wheel the piston is moved to force lubricant from said pump into and through said nozzle.

9. A lubricator for car wheels comprising a pump, a reservoir in communication therewith, a spring held piston movable in said pump, a swiveled nozzle carried by said pump for discharging lubricant into a wheel, a track equipment adapted to be actuated by a wheel to place said piston in a retracted position whereby when said equipment is released by a wheel the piston is moved to force lubricant from said pump into and through said nozzle, and means actuated by a wheel for controlling the discharge through said nozzle.

In testimony whereof I affix my signature in the presence of two witnesses.

BERTRUM FRANKLIN SMITH.

Witnesses:
  JOHN HUGHES,
  SAUL CAPLAN.

Copies of this patent may be obtained for five cents each, by addressing the "Commissioner of Patents, Washington, D. C."